Patented Feb. 13, 1951

2,541,733

UNITED STATES PATENT OFFICE 2,541,733

PRODUCTION OF ALKALI METAL CARBONATE PERHYDRATES

James H. Young, Niagara Falls, N. Y., assignor to E. I. du Pont de Nemours & Company, Wilmington, Del., a corporation of Delaware No Drawing. Application May 22, 1947, Serial No. 749,883

11 Claims. (Cl. 23—63)

This invention relates to the production of alkali metal carbonate perhydrates, also called percarbonates.

Alkali metal carbonates have been reacted under suitable conditions with hydrogen peroxide to yield carbonate perhydrates which precipitate from solution due to their relative insolubility. As with most solid percompounds, particularly those containing combined hydrogen peroxide, stability of such perhydrates is difficult to obtain. The removal of deleterious catalytic impurities from carbonates used in their preparation by treatment with silicate has been proposed in U. S. P. 1,669,997 as a means of improving stability. Such a process, however, is not entirely satisfactory because silica precipitates out, particularly when such systems are heated, in a gelatinous form which is difficult to remove. I have discovered that such finely precipitated silica is itself a decomposition catalyst, or becomes such because of adsorbed contaminants removed from the impure carbonate.

The above type carbonate-silicate systems are also disadvantageous in that they result in the formation of very finely divided carbonate perhydrates. Such perhydrates entrain 20 to 50% of the weight of the mother liquor which makes drying difficult and results in dry products containing less than the desired amount of active oxygen. The products are contaminated with traces of silica contained adsorbed catalytic impurities and are not suitably stable. At 50° C. they tend to lose from 5 to 10% or more of their active oxygen during a period of one month and generally are completely decomposed within 6 months. At ordinary temperatures active oxygen losses are generally around 0.5 to 1% per month. It is important that products of this type be stable at temperatures as high as 50° C. since temperatures of that order are not uncommon in tropical regions.

It is an object of the present invention to provide an improved method for preparing alkali metal carbonate perhydrates of improved stability. A particular object is a sodium carbonate perhydrate having excellent stability in the form of well-defined crystals whose chemical composition corresponds closely to the formula $$Na_2CO_3.1.5H_2O_2$$

and a method of preparing such a product. Still further objects will be apparent from the ensuing description.

The above objects are accomplished in accordance with the invention by employing in the production of the perhydrate an alkali metal carbonate which has been purified by intimately contacting a solution thereof with a solid carbonate of magnesium or calcium in finely divided form. I have discovered that the carbonates of magnesium and calcium, which are preferably precipitated in the carbonate solution being purified, act as collectors for deleterious impurities present in such solutions and, consequently, should be completely separated from such solutions before the latter are used in the production of perhydrates. Alkali metal carbonates purified in this manner may be employed in accordance with my invention to prepare perhydrates by reaction with hydrogen peroxide in any of the various ways known heretofore for effecting such reactions. It is preferred, however, that the purified carbonate be added gradually to cooled aqueous hydrogen peroxide under agitation in the presence of undissolved preformed carbonate perhydrate. The presence of a peroxide stabilizer during the reaction is also advantageous.

When sodium carbonate purified in accordance with my invention is reacted with hydrogen peroxide under preferred conditions in the proportions corresponding to at least 1.5, e. g., 1.5–1.6, moles of $H_2O_2$ per mole of $Na_2CO_3$, a product of outstanding characteristics is obtained. The dried product is in the form of large well formed rod-shaped crystals of hexagonal cross-section having a chemical composition corresponding closely to that represented by the formula $Na_2CO_3.1.5H_2O_2$. The initial active oxygen content in the form of combined $H_2O_2$ is at least 14.9% and generally at least 15% by weight compared with the theoretical value of 15.29% for $Na_2CO_3.1.5H_2O_2$. The chemical composition of the product corresponds to a mole ratio of $H_2O_2:Na_2CO_3$ within the range 1.45–1.496. The product will usually contain from about 1 to not more than 10 P. P. M. of Fe and when stabilized with a silicate will contain the equivalent of about 0.1 to 0.5% of $SiO_2$. It is composed predominantly of crystals of length between 0.1 to 1 mm. and diameter of between 0.05 and 0.2 mm., and is exceptionally stable even at temperatures as high as 50° C., the active oxygen losses occurring during 1 month at 50° C. being not more than about 2% and generally not more than about 1% by weight of the original content of active oxygen. Active oxygen losses at 50° C. over a period of about 6 months will average not more than about 5% and generally will be on the order of about 2% or less per month. Losses at ordinary temperatures over a period of about 1 year are on the order of about 0.1% per month.

The invention may be further illustrated by the following examples. All storage stability tests referred to in the examples were carried out in covered glass containers vented to the atmosphere.

Example 1

1300 g. of soda ash was dissolved in 3 l. of water. The heat of solution raised the temperature to 50 to 60° C. 3 g. of magnesium chloride hexahydrate dissolved in a few cc. of water was added slowly with good stirring. The hot solution was allowed to stand for about 16 hours at about 40° C. to allow the precipitate to settle, after which it was filtered. The crystal clear filtrate contained, by analysis, 39.9 g. of $Na_2CO_3$ per 100 cc. and 0.5 P. P. M. of iron as Fe. The original carbonate contained in excess of 10 P. P. M. Fe.

Example 2

To 1250 cc. of sodium carbonate solution purified as in Example 1 containing 4.7 moles of $Na_2CO_3$ there was added 10 g. of a filtered sodium silicate solution containing the equivalent of 5% $Na_2O$ and 12.5% $SiO_2$ by weight. The carbonate solution was cooled rapidly to 26° C. to precipitate part of the carbonate as the decahydrate. The resulting slurry was added during the course of one hour to 700 g. of about 35% hydrogen peroxide solution containing 7.04 moles of $H_2O_2$. The latter solution was cooled to 3.5° C. and was agitated by stirring. 5 g. of seed crystals of sodium carbonate perhydrate from a previous batch was gradually fed to the hydrogen peroxide solution while the first 10 to 15% of the carbonate slurry was being added. The temperature was maintained throughout at 2 to 4° C. After an additional 20 minutes of stirring, 8 g. more of the filtered silicate solution was added along with 0.5 g. of magnesium chloride hexahydrate. Stirring was continued for an additional 1¾ hours at 2 to 3° C. after which 594 g. of large moist crystals of sodium carbonate perhydrate containing 14.7% by weight of active oxygen was separated by centrifuging. The crystals were dried in thin layers in stainless steel pans for one hour at 40 to 60° C. The dried product weighed 550 g. and contained 15.23% by weight of active oxygen. Its composition, as indicated by analysis, corresponded to a mole ratio of $H_2O_2:Na_2CO_3$ of 1.496. Part of the product was stored at 50° C. and part at room temperature. The active oxygen lost during one month at 50° C. was 0.61% of the original. After 11.5 months at room temperature the active oxygen content was 15.06%, the average loss per month being 0.096%.

Example 3

The remarkable stability of products prepared in accordance with the preferred modification of the invention is indicated by the following table. The first 4 products whose compositions and stabilities are shown were prepared in a manner closely resembling the method described in Example 2. The last product whose composition is shown was a commercial sodium carbonate perhydrate.

| Composition of Product | | | Mole Ratio $H_2O_2:Na_2O_2$ | Storage | | Ave. Per Cent Act. O Loss Per Month |
|---|---|---|---|---|---|---|
| Per Cent $H_2O_2$ | Per Cent $Na_2CO_3$ | Purity | | Time | Temp. | |
| 32.14 | 67.16 | 99.30 | 1.492 | 28 days | 50° C | 0.50 |
|  |  |  |  | 11.5 mo | Room | 0.12 |
| 32.04 | 66.99 | 99.03 | 1.491 | 28 days | 50° C | 1.0 |
|  |  |  |  | 11.5 mo | Room | 0.09 |
| 32.26 | 67.54 | 99.80 | 1.489 | 20 days | 50° C | 0 |
|  |  |  |  | 6.5 mo | 50° C | 1.83 |
|  |  |  |  | 11.5 mo | Room | 0.06 |
| 32.18 | 67.38 | 99.56 | 1.489 | 33 days | 50° C | 0.53 |
|  |  |  |  | 7.25 mo | 50° C | 1.31 |
|  |  |  |  | 11.5 mo | Room | 0.07 |
| 29.56 | 68.65 | 98.2 | 1.34 | 26 days | 50° C | 6.24 |
|  |  |  |  | 6 mo | 50° C | (¹) |
|  |  |  |  | 15 mo | Room | 0.42 |

¹ Completely decomposed in 6 months.

Example 4

Sodium carbonate perhydrate was prepared as described in Example 2. About two-thirds of the product slurry was removed. To the remaining one third which served as a seeded "heel," there was added 261.5 g. of an approximately 35% hydrogen peroxide solution containing 2.54 moles $H_2O_2$. To 450 cc. of sodium carbonate solution purified as in Example 1 and containing 1.69 moles $Na_2CO_3$ there was added 3 cc. of the sodium silicate solution described in Example 2. The resulting solution was immediately, and without crystallization occurring, run into the mixture containing the hydrogen peroxide. The addition required one hour. The resulting product was centrifuged and dried. The large well-formed rod-shaped crystals of hexagonal cross-section obtained contained 15.0% active oxygen. A screen test of the product showed:

|  | Per cent |
|---|---|
| + 74 mesh | 15 |
| +120 mesh | 31 |
| +150 mesh | 30.5 |
| +200 mesh | 15.0 |
| −200 mesh | 7.6 |

Example 5

Sodium carbonate perhydrate was prepared as described in Example 4. About two-thirds of the product slurry was removed. The remaining one-third was employed as a seeded reaction mixture in which the preparation was repeated. The final dried product consisted of large well-formed hexagonal crystals analyzing 15.04% active oxygen, 5.3 P. P. M. Fe and 0.29% $SiO_2$. A screen test showed:

|  | Per cent |
|---|---|
| +48 mesh | 3.1 |
| +74 mesh | 25.0 |
| +120 mesh | 42.0 |
| +150 mesh | 16.0 |
| +200 mesh | 8.7 |
| −200 mesh | 5.5 |

Microscopical measurements showed that the above product was composed predominantly of hexagonal crystals having a length of between about 0.2 and 1.0 mm. and a diameter of between about 0.05 and 0.2 mm. The product was not extensively aggregated as are products produced by prior procedures but was composed largely of individual separate crystals. Its excellent stability at 50° C. is shown by the following table:

| Days Stored | Per Cent Act. Oxygen After Storage | Calculated Per Cent Loss per Month |
|---|---|---|
| 15 | 15.00 | 0.53 |
| 26 | 14.93 | 0.84 |
| 35 | 14.93 | 0.63 |
| 68 | 14.90 | 0.41 |

I have discovered that the stability of the product depends to a substantial extent upon its crystal size and that generally the larger the crystals the greater is the stability. This is illustrated by the following stability data on samples obtained by fractionally screening a product prepared substantially as described in Example 2. The tests were for a 1 month period at 50° C.

| Sample | Mesh Size | Per Cent Original Act. Oxygen Lost |
|---|---|---|
| A | >60 | 1.8 |
| B | 60–120 | 5.3 |
| C | <120 | 10.7 |

While the above oxygen losses are somewhat higher than normal for products prepared in accordance with the invention, due to contamination resulting from contact with the brass screens employed, they show clearly the effect of crystal size on stability. It is, accordingly, distinctly advantageous to employ the seeding technique which facilitates obtainment of large crystals. Seed crystals of large size also favor formation of product of large crystal size. Thus, the seed crystals employed in Example 4 were substantially smaller in size than those in Example 5 and the screen analysis of the products show a substantially larger proportion of large crystals when the larger seed crystals were used.

*Example 6*

1300 g. of soda ash was dissolved in 3 l. of water. The temperature rose to 50–60° C. While stirring the solution 3 g. of C. P. calcium carbonate ($CaCO_3$) was added as a fine powder. Stirring was continued for 30 minutes and the solution was then digested for several hours at 40° C. then filtered. Two batches of sodium carbonate perhydrate prepared from the resulting crystal clear solution substantially as described in Example 2 contained 15.0 and 15.23% active oxygen when dry and showed excellent stability.

The purification steps of my invention may be practiced employing preformed solid magnesium or calcium carbonate but precipitation of the purifying agent in the solution being purified is preferred. This may be accomplished by employing as the precipitating agent any soluble magnesium or calcium salt which has no adverse effect upon the peroxide system, i. e., does not introduce constituents which form or act as peroxide decomposition catalysts. Suitable precipitating agents are the chlorides, sulfates, nitrates, acetates and like salts of magnesium and calcium. Magnesium and calcium permanganate are illustrative of salts which are unsuitable. By "soluble" magnesium or calcium salt is meant any such salt which is sufficiently soluble in water to provide a concentration of magnesium or calcium ion which will effect precipitation of magnesium or calcium carbonate in the system.

Excellent results are obtained employing relatively small amounts of the precipitating agent, e. g., amounts equal to about 0.1 to 0.3% based on the weight of the alkali metal carbonate in the solution being purified. Larger amounts, e. g., as high as 5% or higher, may be used successfully although no particular advantage generally follows the employment of amounts in excess of about 1%. If a preformed solid purifying agent is employed, the amounts used should be about double those given above for the precipitating agent. The preferred purifying agent, particularly when formed in situ, is magnesium carbonate.

Addition of the precipitating agent causes the precipitation in the carbonate solution of a magnesium or calcium carbonate, e. g., magnesium carbonate or basic carbonate. After the precipitation the carbonate solution is preferably digested for a time to facilitate flocculation. The magnesium or calcium carbonate, formed in situ or added in preformed condition, is then completely separated from the carbonate solution, e. g., by sedimentation, filtration or both. A filter aid may be employed if desired. Since the purifying agent acts as a collector for deleterious impurities, its complete removal from the carbonate solution is important in order to eliminate such impurities as completely as possible from the system. For best results the purified solution should contain not more than 1.5 and preferably less than 0.5 P. P. M. of Fe. Harmful impurities other than iron are also removed by the purification treatment.

Alkali metal carbonate solutions of a wide range of carbonate to water ratios may be successfully purified by the present method provided intimate contact between the solution and the purifying agent is effected and the latter is subsequently completely separated from the solution. In practice, purification will generally be carried out using carbonate solutions of concentrations of about 20 to 32% by weight.

The reaction between the carbonate and hydrogen peroxide will generally be carried out at about −5 to 10° C., the preferred temperatures being about 0 to 5° C.

In the preferred embodiment of the invention the purified carbonate is treated with a peroxide stabilizer as an added protection against residual impurities in the reactants. Some stabilizers may be added to the hydrogen peroxide rather than to the carbonate. I prefer, however, to employ a silicate stabilizer and to add it to the carbonate before the reaction with hydrogen peroxide. Sodium silicate is well suited for this purpose and silicate of most any $Na_2O:SiO_2$ ratio may be used. Ordinarily, 40° Baumé sodium silicate solution containing the equivalent of about 10% $Na_2O$ and 25% $SiO_2$ by weight is very satisfactory. The silicate should be as clean as possible and free of suspended material and it is generally advisable to use a dilute, freshly filtered water solution. Magnesium silicate is also an excellent stabilizer and may be added as such either to the purified carbonate or the reaction mixture, or it may be formed in situ in the purified carbonate solution or the reaction mixture. When using a silicate stabilizer, it is important that the amount employed be not greater than 1.5% by weight based on the weight of $Na_2CO_3$. Larger amounts interfere with crystal formation and result in products of fine particle size which cannot readily be separated and dried to give high test stable products. The preferred amount is about 0.3 to 1.0% by weight based upon the weight of $Na_2CO_3$. Stabilizer may be added to the preformed carbonate perhydrate if desired.

The purified carbonate may be used in the form of a solution, or the purified solution may be cooled to precipitate part of the carbonate and the resulting slurry added to the hydrogen peroxide. Another alternative is to cool or evaporate the purified solution so as to separate solid $Na_2CO_3.H_2O$ or $Na_2CO_3.10H_2O$ which may be added in solid form to the hydrogen peroxide.

Carbonate purified in accordance with the invention may be used with beneficial results regardless of the proportions of the carbonate and hydrogen peroxide employed. Best results, however, follow the use of carbonate and hydrogen peroxide in such proportions as will result in the precipitation of a perhydrate containing approximately one mole of metal carbonate per 1½ moles of $H_2O_2$. Accordingly, it is preferred to employ, for example, hydrogen peroxide and sodium carbonate in amounts corresponding to a mole ratio of $H_2O_2:Na_2CO_3$ of 1.5–1.6:1.

The presence of seed crystals in the reaction mixture can be conveniently insured by adding crystals of preformed product to the hydrogen peroxide solution to which the carbonate is added in an amount in excess of that which will dissolve. At 0 to 5° C. that amount is of the order of 10 to 15% by weight of the hydrogen peroxide solution. Smaller quantities will suffice if the crystals are fed slowly to the reaction mixture simultaneously with the addition of the carbonate. A preferred procedure which minimizes seeding and insures the desired crystal formation is to start with a small quantity of seeded hydrogen peroxide solution and built up by alternately or simultaneously adding hydrogen peroxide solution and purified carbonate. Portions of the resulting product slurry may be removed either continuously or intermittently, and more hydrogen peroxide and carbonate added in the same manner.

Hydrogen peroxide solutions of various concentrations may be employed as is well-known from prior processes. Generally, solutions of concentrations ranging from about 10 to 90%, preferably at least 30%, by weight $H_2O_2$ will be used. Use of highly concentrated solutions, e. g., 70–90%, is advantageous when employing the carbonate in solid form, e. g., as $Na_2CO_3.10H_2O$. There should be present in the final reaction mixture sufficient water to permit effective agitation while avoiding such amounts as will cause the loss of a substantial amount of the desired perhydrate product in the mother liquor upon separation of the product. Accordingly, the concentration of the hydrogen peroxide solution employed will depend to some extent upon the water content of the carbonate.

An excess of free carbonate is preferably avoided in the reaction mixture. When carbonate solution is added to hydrogen peroxide solution the addition will generally require 1 to 3 hours. Addition of a large amount of carbonate suddenly is not advisable since it results in supersaturation with formation of fine crystals. Addition of hydrogen peroxide to carbonate solution also favors obtaining fine crystals. The perhydrate product may be removed from the reaction medium by settling, filtration or by use of a centrifuge. The latter is preferred. When prepared in accordance with the preferred method, the wet crystals will entrain not more than about 5 to 10% by weight of water.

Rapid drying of the crystals is advantageous in view of which drying in thin layers is recommended. Tray, rotary or belt driers may be used. Vacuum drying is not necessary but can be employed. At atmospheric pressure and with a good stream of dry air temperatures at about 40 to 60° C. are preferred. Higher temperatures may be used but tend to loosen the carbonate-perhydrate bond and diminish storage stability.

Processing equipment may be made of glass, stainless steel, Monel or wood. Care should be exercised to prevent the introduction into the system of heavy metal impurities which act as decomposition catalysts.

Alkali metal carbonate perhydrates in general and particularly the present improved sodium carbonate perhydrate are useful as bleaching agents and are characterized by their outstanding activity at low temperatures. They are also valuable for use in oral hygiene and similar fields because they are non-toxic.

I claim:

1. A process for producing sodium carbonate perhydrate comprising adding to an aqueous solution of sodium carbonate a soluble magnesium salt in an amount equal to 0.1 to 1% by weight based on the weight of $Na_2CO_3$ in said solution, separating completely from said solution the resultant precipitate of a magnesium carbonate, adding a silicate stabilizer to the resulting sodium carbonate solution and then adding the solution containing said stabilizer gradually to an agitated aqueous solution of hydrogen peroxide containing preformed crystals of sodium carbonate perhydrate while maintaining said hydrogen peroxide solution at a temperature of −5 to 10° C., separating product sodium carbonate perhydrate crystals from the resulting mixture and drying said product crystals, said sodium carbonate solution containing the stabilizer and said hydrogen peroxide solution being employed in amounts corresponding to 1.5–1.6 moles of $H_2O_2$ per mole of $Na_2CO_3$.

2. The process of claim 1 wherein the silicate stabilizer is added in an amount not exceeding 1.5% based on the weight of $Na_2CO_3$.

3. The process of claim 1 wherein the hydrogen peroxide solution to which the sodium carbonate solution is added contains preformed crystals of sodium carbonate perhydrate consisting predominantly of hexagonally shaped crystals having a length of 0.1 to 1.0 mm. and a diameter of 0.05 to 0.2 mm.

4. In a process for producing an alkali metal carbonate perhydrate by the reaction of an alkali metal carbonate with hydrogen peroxide in an aqueous reaction medium from which the perhydrate product is precipitated, the improvement comprising effecting said reaction in a medium which initially contains preformed crystals of said alkali metal carbonate perhydrate.

5. The process of claim 4 wherein the carbonate reacted is sodium carbonate.

6. The process of claim 5 wherein the preformed perhydrate crystals present in the reaction medium consist predominantly of hexagonally shaped crystals having a length of 0.1 to 1.0 mm. and a diameter of 0.05 to 0.2 mm.

7. The process of claim 5 wherein the reaction is carried out by adding a solution of sodium carbonate containing a peroxide stabilizer to a cooled aqueous hydrogen peroxide solution.

8. The process of claim 7 wherein at least 1.5 moles of hydrogen peroxide are employed per mole of sodium carbonate and the solution of sodium carbonate contains a silicate stabilizer in an amount not exceeding 1.5% by weight based on the sodium carbonate.

9. The process of claim 4 wherein the alkali metal carbonate is purified prior to its reaction with the hydrogen peroxide by a procedure comprising intimately contacting an aqueous solution of said carbonate with a finely divided solid purifying agent formed in situ in said solution and being selected from the group consisting of the carbonates of magnesium and calcium and separating said purifying agent from said solution.

10. The process of claim 9 wherein the carbonate purified is sodium carbonate.

11. The process of claim 10 wherein the purifying agent is magnesium carbonate.

JAMES H. YOUNG.

REFERENCES CITED

The following references are of record in the file of this patent:

UNITED STATES PATENTS

| Number | Name | Date |
|---|---|---|
| 1,225,722 | Schaidhauf | May 8, 1917 |
| 1,669,997 | Noll | May 15, 1928 |
| 1,950,320 | Muller | Mar. 6, 1934 |
| 1,997,691 | Koch | Apr. 16, 1935 |
| 2,012,854 | Hill | Aug. 27, 1935 |
| 2,143,069 | Hill | Jan. 10, 1939 |
| 2,167,997 | Reichert | Aug. 1, 1939 |

FOREIGN PATENTS

| Number | Country | Date |
|---|---|---|
| 100,997 | Great Britain | Aug. 3, 1916 |

OTHER REFERENCES

Mellor: Comprehensive Treatise on Inorganic and Theoretical Chemistry, vol. 2, pages 724, 725. Longmans, Green and Co., N. Y.

Lunge: Sulphuric Acid and Alkali, vol. II, part II, London, 1909, page 745.